United States Patent
Ross et al.

(10) Patent No.: US 9,291,107 B2
(45) Date of Patent: Mar. 22, 2016

(54) ENGINE OVERSPEED SHUTDOWN SYSTEMS AND METHODS

(71) Applicants: Bryan Kelly Ross, Snoqualmie, WA (US); James Castner, Lake Forest Park, WA (US)

(72) Inventors: Bryan Kelly Ross, Snoqualmie, WA (US); James Castner, Lake Forest Park, WA (US)

(73) Assignee: PACCAR Inc, Bellevue, WA (US)

( * ) Notice: Subject to any disclaimer, the term of this patent is extended or adjusted under 35 U.S.C. 154(b) by 340 days.

(21) Appl. No.: 13/837,054

(22) Filed: Mar. 15, 2013

(65) Prior Publication Data

US 2014/0261314 A1    Sep. 18, 2014

(51) Int. Cl.
*F02D 13/02*    (2006.01)

(52) U.S. Cl.
CPC ............ *F02D 13/0242* (2013.01); *F02D 13/02* (2013.01)

(58) Field of Classification Search
CPC ..... F02D 13/00; F02D 13/02; F02D 13/0203; F02D 13/0207; F02D 13/0215; F02D 13/00253; F02D 13/06; F02D 13/08; F02D 13/0242
See application file for complete search history.

(56) References Cited

U.S. PATENT DOCUMENTS

| | | | |
|---|---|---|---|
| 2,100,550 A | 11/1937 | Moore | |
| 2,482,460 A | 9/1949 | Browne | |
| 2,708,979 A | 5/1955 | Reynoldson | |
| 2,714,883 A | 8/1955 | Metzger | |
| 2,908,258 A | 10/1959 | Schowalter | |
| 3,109,507 A | 11/1963 | McMurray | |
| 3,365,014 A | 1/1968 | Clingerman | |
| 3,378,119 A | 4/1968 | Schaefer | |
| 3,433,209 A | 3/1969 | Freitag | |
| 3,556,463 A | 1/1971 | Williams | |

(Continued)

FOREIGN PATENT DOCUMENTS

| GB | 1 249 262 | 10/1971 |
|---|---|---|
| GB | 1 563 265 | 3/1980 |

(Continued)

OTHER PUBLICATIONS

Hrovat, D., and J. Sun, "Models and Control Methodologies for IC Engine Idle Speed Control Design," Control Engineering Practice 5(8):1093-1100, Aug. 1997.

(Continued)

*Primary Examiner* — Lindsay Low
*Assistant Examiner* — Jacob Amick
(74) *Attorney, Agent, or Firm* — Christensen O'Connor Johnson Kindness PLLC

(57) ABSTRACT

Approaches to control engine overspeed are provided. Engine overspeed is controlled by one or more mechanisms that operate the intake and/or exhaust valves of the engine to interrupt the combustion cycle. In use, the "combustion interrupter" mechanism(s) actuate the intake and/or exhaust valves according to, for example, one or more control strategies in order to interrupt the combustion cycle and/or cause the engine to expend energy to move the pistons through a complete cycle in an aim to retard engine speed. The engine's cam(s) can include one or more sets of variable valve timing lobes that operate the intake and/or exhaust valves of the engine in order to, for example, interrupt the combustion cycle. The combustion interrupter mechanism can additionally or alternatively include one or more computer controlled actuators that operate the intake and/or exhaust valves in order, for example, to interrupt the combustion cycle.

24 Claims, 5 Drawing Sheets

(56) References Cited

U.S. PATENT DOCUMENTS

| | | |
|---|---|---|
| 3,601,103 A | 8/1971 | Swiden |
| 3,952,827 A | 4/1976 | Drutchas |
| 3,999,386 A | 12/1976 | Crull |
| 4,062,332 A | 12/1977 | Perr |
| 4,102,316 A | 7/1978 | Valbert |
| 4,129,040 A | 12/1978 | Hayden, Jr. |
| 4,282,838 A | 8/1981 | Davidson |
| 4,302,931 A | 12/1981 | White |
| 4,340,126 A | 7/1982 | Larson |
| 4,359,016 A | 11/1982 | Bachmann |
| 4,387,679 A | 6/1983 | Folger |
| 4,499,733 A | 2/1985 | Farr |
| 4,501,238 A | 2/1985 | Odum |
| 4,517,796 A | 5/1985 | McCombs, Jr. |
| 4,554,991 A | 11/1985 | Eden |
| 5,301,499 A | 4/1994 | Kure-Jensen |
| 5,927,064 A | 7/1999 | Dyer |
| 5,947,863 A | 9/1999 | Grob |
| 6,257,194 B1 | 7/2001 | Kerns |
| 6,276,328 B1 | 8/2001 | Denton |
| 6,321,525 B1 | 11/2001 | Rogers |
| 6,401,446 B1 | 6/2002 | Gibbons |
| 6,431,154 B1 | 8/2002 | Inoue |
| 6,895,325 B1 | 5/2005 | Munson, Jr. |
| 6,941,217 B1 | 9/2005 | Munson, Jr. |
| 7,036,318 B1 | 5/2006 | Munson, Jr. |
| 7,207,309 B2 | 4/2007 | Adams |
| 7,424,360 B1 | 9/2008 | Munson, Jr. |
| 2003/0213444 A1 | 11/2003 | Cornell |
| 2007/0089416 A1 | 4/2007 | Weber |
| 2009/0005216 A1* | 1/2009 | Whitney et al. ............... 477/107 |
| 2009/0173062 A1* | 7/2009 | Hu .................................. 60/295 |

FOREIGN PATENT DOCUMENTS

| | | |
|---|---|---|
| JP | 9-195806 A | 7/1997 |
| SU | 00926336 A1 | 5/1982 |

OTHER PUBLICATIONS

International Search Report and Written Opinion mailed Jun. 5, 2014, issued in corresponding International Application No. PCT/US2014/021364, filed Mar. 6, 2014, 6 pages.

* cited by examiner

ENGINE OVERSPEED SHUTDOWN SYSTEMS AND METHODS

BACKGROUND

Engine overspeed is a condition in which an engine is allowed or forced to turn beyond its design limit. The consequences of running an engine too fast vary by engine type and model and depend upon several factors, chief amongst them the duration of the overspeed and the speed attained. With some engines even a momentary overspeed can result in greatly reduced engine life or even catastrophic failure.

One type of engine that is proned to overspeed is the diesel engine. Unlike a gasoline engine, where the engine speed is regulated by a butterfly valve controlled by the throttle mechanism, a diesel engine's speed is generally controlled by varying the supply of fuel.

In many environments having flammable or explosive vapors or dust, including oil fields, mines, chemical plants and in some instances vehicles, diesel engine overspeed is a real concern. In these environments, such a fuel source is drawn into the air intake of the diesel engine, resulting in uncontrollable engine speeds, also known as a runaway condition. In particular, the engine reaches a point where it can operate uncontrollably even though the engine's own fuel supply has been shut off.

In vehicles, oil mist from the crankcase can be blown into the air intake via the conventional crankcase breather pipe. The unwanted oil mist can also come from failure of the oil seals in a turbocharged diesel engine, from overfilling the crankcase with oil, or certain other mechanical problems such as a broken internal fuel pipe. In vehicles or installations that use both diesel engines and bottled gas, a gas leak into the engine room could also provide fuel for a runaway condition via the engine air intake.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter In accordance with aspects of the present disclosure, an engine overspeed system is provided. The system includes an engine having at least one combustion chamber defined by a cylinder, a piston operable to reciprocate within the cylinder, and at least one intake valve and at least one exhaust valve associated with the cylinder. The engine in some embodiments having an engine cycle comprising an intake stroke, a compression stroke, an expansion stroke, and an exhaust stroke. The system also includes an engine overspeed suppression mechanism configured to move the exhaust valve between a valve open position in which gases may enter and/or exit from the combustion chamber and a closed position in which gases are inhibited from entering and/or exiting the combustion chamber. The system further includes at least one control component being in communication with the engine overspeed suppression mechanism. The at least one control component in some embodiments is configured to cause the engine overspeed suppression mechanism to move of the exhaust valve to the open position during a second stage of the compression stroke, wherein the intake valve is closed during the compression stroke.

In accordance with aspects of the present disclosure, an engine overspeed system is provided. The system includes an engine having at least one combustion chamber defined by a cylinder, a piston operable to reciprocate within the cylinder, and at least one intake valve and at least one exhaust valve associated with the cylinder. The engine in some embodiments has an engine cycle comprising an intake stroke, a compression stroke, an expansion stroke, and an exhaust stroke. The system also includes an engine overspeed suppression mechanism that includes first and second controllable actuators, said first and second actuators configured to move the intake valve and the exhaust valve, respectively, between a valve open position in which gases may enter and/or exit from the combustion chamber and a closed position in which gases are inhibited from entering and/or exiting from the combustion chamber. The system further includes at least one control component being in communication with the engine overspeed suppression mechanism. The control component in some embodiments is configured to cause the first actuator to move the intake valve to the closed position during the intake stroke and the compression stroke and configured to cause the second actuator to move the exhaust valve to the open position during at least one of the intake stroke, the compression stroke, and a second stage of the compression stroke.

In accordance with another aspect of the present disclosure, a method is provided for suppressing an engine overspeed condition of an engine. The engine in some embodiments have at least one combustion chamber defined by a cylinder, a piston operable to reciprocate within the cylinder, and at least one intake valve and at least one exhaust valve associated with the cylinder. The engine also has an engine cycle comprising an intake stroke, a compression stroke, an expansion stroke, and an exhaust stroke. The method includes determining whether the engine is operating in an engine overspeed condition, and operating an engine overspeed suppression mechanism when the engine is operating in the engine overspeed condition. Operating the engine overspeed suppression mechanism in some embodiments comprises opening the exhaust valve during the intake stroke and opening the exhaust valve during at least a portion of the compression stroke.

In accordance with another aspect of the present disclosure, a method is provided for suppressing an engine overspeed condition of an engine. The engine includes at least one combustion chamber defined by a cylinder, a piston operable to reciprocate within the cylinder, and at least one intake valve and at least one exhaust valve associated with the cylinder. The engine has an engine cycle comprising an intake stroke, a compression stroke, an expansion stroke, and an exhaust stroke. The method includes determining whether the engine is operating in an engine overspeed condition, and operating an engine overspeed suppression mechanism when the engine is operating in the engine overspeed condition. Operating the engine overspeed suppression mechanism in some embodiments includes closing the intake valve during the compression stroke, closing the exhaust valve during a first stage of the compression stroke, and thereafter opening the exhaust valve during a second stage of the compression stroke.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
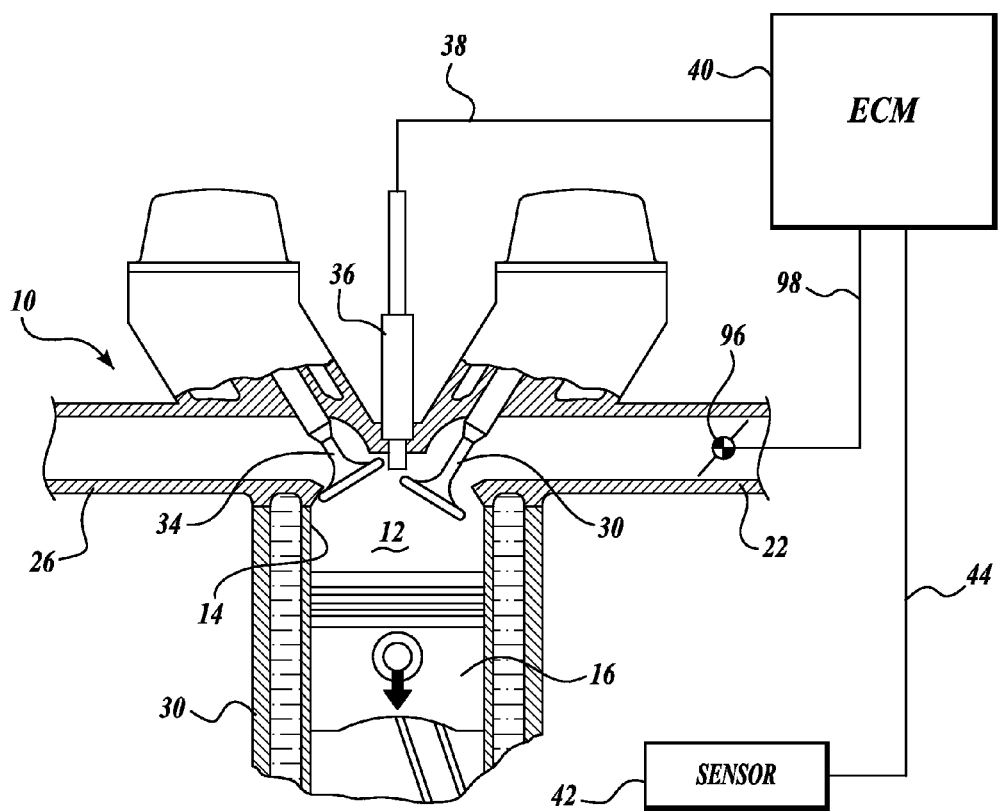
FIG. 1 illustrates a schematic representation of one example of a compression ignition internal combustion engine according to aspects of the present disclosure.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Prior to discussing the details of various aspects of the present disclosure, it should be understood that the following description includes sections that are presented largely in terms of logic and operations that may be performed by conventional electronic components. These electronic components may be grouped in a single location or distributed over a wide area, and can generally include processors, memory, storage devices, input/output circuitry, etc. It will be appreciated by one skilled in the art that the logic described herein may be implemented in a variety of configurations, including but not limited to, hardware, software, and combinations thereof. In circumstances were the components are distributed, the components are accessible to each other via communication links.

Generally described, the present disclosure is directed to several approaches to control engine overspeed. As will be described in more detail below, engine overspeed is controlled by one or more mechanisms that operate the intake and/or exhaust valves of the engine to interrupt the combustion cycle. In use, the "combustion interrupter" mechanism(s) actuate the intake and/or exhaust valves according to, for example, one or more control strategies in order to interrupt the combustion cycle and/or cause the engine to expend energy to move the pistons through a complete cycle in an aim to retard engine speed. In some embodiments, the engine's cam(s) includes one or more sets of variable valve timing lobes that operate the intake and/or exhaust valves of the engine in order to, for example, interrupt the combustion cycle. In other embodiments, the combustion interrupter mechanism includes one or more computer controlled actuators that operate the intake and/or exhaust valves in order, for example, to interrupt the combustion cycle. In these embodiments, the one ore more computer controlled actuators can operate in conjunction with or separately from the engine's camshaft(s). In some embodiments, the combustion interrupter mechanism is activated when the engine has attained a threshold engine speed (RPM).

The following disclosure describes seven (7) embodiments drawn to various techniques or control strategies for retarding the engine speed by actuating the engine's intake and/or exhaust valves differently from normal operation. For example, the engine valves can be operated in a "normal" state, where the engine is operating within a preselected RPM range or according to other preselected "normal" operating parameters, and an "overspeed" state, where the engine is overspeeding. These seven techniques are directed to different combinations of valve positions during, for example, the "intake" and/or "compression" strokes of the engine cycle to retard the speed of the engine in order for the engine to transition from the "overspeed" state back to, for example, the "normal" state.

The various engine retard control strategies for controlling and/or obviating the engine overspeed condition will now be described in detail. A first embodiment of an engine retard control strategy controls the opening and closing of the intake valve and/or exhaust valve as follow. As the engine cycles through its intake stroke, compression stroke, expansion stroke, and exhaust stroke, the intake valve is operated in its normal manner (i.e., in an open position during the intake stroke, and closed during the compression stroke, expansion stroke, and exhaust stroke) while the exhaust valve is operated in a normal manner during the intake stroke, expansion stroke, and exhaust stroke. In one embodiment, this can occur via normal cam actuation.

However, for this control strategy at the end of the intake stroke or sometime during the compression stroke, the exhaust valve is moved to the open position. As such, during the intake stroke (intake valve open), intake air is allowed to enter the combustion chamber through the intake valve(s), and during the compression stroke the exhaust valve is opening, allowing venting of the intake air, and in turn, keeping the combustion chamber from building pressure during the compression stroke. This keeps the cylinder pressure low enough that even if there is a proper amount of fuel and air, no combustion can occur. It will be appreciated that in this embodiment, the exhaust valve is opened for a duration capable to prevent sufficient compression for compression ignition. This may occur at the same time during the compression stroke or during segments of the compression stroke in which the exhaust valve is cycles between open and closed.

In a second embodiment of the engine retard control strategy, the intake valve and/or exhaust valve are controlled as follow. Similar to the first embodiment, as the engine cycles through its intake stroke, compression stroke, expansion stroke, and exhaust stroke, the intake valve is operated in its normal manner (i.e., in an open position during the intake stroke, and closed during the compression stroke, expansion stroke, and exhaust stroke) while the exhaust valve is operated in a normal manner during the intake stroke, expansion stroke, and exhaust stroke.

However, for this embodiment of the control strategy, the exhaust valve is moved to the open position toward the end of the compression stroke. As such, during the intake stroke (intake valve open), intake air is allowed to enter the combustion chamber through the intake valve(s), and during the first stage of the compression stroke the intake and exhaust valves are closed, forcing the engine to expel energy compressing the contents of the combustion chamber. Then, at the second stage of the compression stroke (e.g., toward the top of the compression stroke) the exhaust valve is opened, and as a result, all of the energy the engine expended into compressing the contents of the combustion chamber is vented at atmosphere (e.g., through an exhaust system of a vehicle). This accomplishes two goals: 1) it keeps the cylinder pressure low enough that even if there is a proper amount of fuel and air, no combustion can occur; 2) it removes energy by dissipating the compressed gasses into the exhaust system. It will be appreciated that in this embodiment, the second stage has a duration capable of preventing sufficient compression for compression ignition.

In a third embodiment of the engine retard control strategy, the intake valve and/or exhaust valve are controlled as follow. In this embodiment, the intake and exhaust valves are in the open position during the intake stroke, allowing both intake air and exhaust gases to enter the combustion chamber. This accomplishes two goals: 1) it allows the maximum amount of air/exhaust gas mixture into the combustion chamber for maximum engine retarding; 2) it brings in exhaust gases that have less oxygen available than the ambient air to oxidize fuel, thus making combustion more difficult. Next, the intake valve is moved to the closed position at a timing that is near below dead center (BDC) of the piston. However, the exhaust valve remains open through the duration of the compression stroke. As a result, the cylinder pressure is low enough that even if there is a proper amount of fuel and air, no combustion can occur.

In a fourth embodiment of the engine retard control strategy, the intake valve and/or exhaust valve are controlled as follow. Similar to the third embodiment, the intake and exhaust valves are in the open position during the intake stroke, allowing both intake air and exhaust gases to enter the combustion chamber. Next, in this embodiment, both intake and exhaust valves are moved to the closed position for the first stage of the compression stroke, forcing the engine to expel energy compressing the contents of the combustion chamber. Then, at the second stage of the compression stroke (e.g., toward the top of the compression stroke) the exhaust valve is opened, and as a result, all of the energy the engine expended into compressing the contents of the combustion chamber is vented at atmosphere (e.g., through an exhaust system of a vehicle). This accomplishes two goals: 1) it keeps the cylinder pressure low enough that even if there is a proper amount of fuel and air, no combustion can occur; 2) it removes energy by dissipating the compressed gasses into the exhaust system. It will be appreciated that in this embodiment, the second stage has a duration capable of preventing sufficient compression for compression ignition.

In a fifth embodiment of the engine retard control strategy, the intake valve and/or exhaust valve are controlled as follow. At the beginning of the intake stroke, the intake valve is closed and the exhaust valve is opened, allowing exhaust gasses to enter the combustion chamber. Due to entry of exhaust gases that have less oxygen available than the ambient air to oxidize fuel, combustion will be more difficult to achieve. In this embodiment, the intake valve remains closed through the duration of the compression stroke. On the other hand, the exhaust valve stays open through the duration of the compression stroke. As a result, the cylinder pressure is kept low enough that even if there is proper amounts of fuel and air no combustion can occur. It will be appreciated that in some embodiments, the exhaust valve can be moved to the open position at any time or duration during the intake stroke.

In a sixth embodiment of the engine retard control strategy, the intake valve and/or exhaust valve are controlled as follow. At the beginning of the intake stroke, the intake valve is closed and the exhaust valve is opened, allowing exhaust gasses to enter the combustion chamber. Due to entry of exhaust gases that have less oxygen available than the ambient air to oxidize fuel, combustion will be more difficult to achieve. In this embodiment, the intake valve remains closed through the duration of the compression stroke. On the other hand, the exhaust valve stays open during the compression stroke, and is moved to the closed position for the first stage of the compression stroke, forcing the engine to expel energy compressing the contents of the combustion chamber. Then, at the second stage of the compression stroke (e.g., toward the top of the compression stroke) the exhaust valve is opened, and as a result, all of the energy the engine expended into compressing the contents of the combustion chamber is vented at atmosphere (e.g., through an exhaust system of a vehicle). This accomplishes two goals: 1) it keeps the cylinder pressure low enough that even if there is a proper amount of fuel and air, no combustion can occur; 2) it removes energy by dissipating the compressed gasses into the exhaust system. It will be appreciated that in this embodiment, the second stage has a duration capable of preventing sufficient compression for compression ignition. Moreover, it will be appreciated that in some embodiments, the exhaust valve can be moved to the open position at any time or duration during the intake stroke.

In a seventh embodiment of the engine retard control strategy, the intake valve and/or exhaust valve are controlled as follow. The intake and exhaust valves are closed at the beginning of the intake stroke and remain closed until just before the below dead center (BDC) of the piston. This forces the over speeding engine to exert energy and pull a vacuum in the combustion chamber. Then, just before BDC on the intake stroke, the intake and/or exhaust valve opens and normalizes pressure in the combustion chamber. The intake and/or exhaust valve that opens just before BDC then closes just after BDC when the combustion chamber pressure has been normalized.

Next, the intake valve remains closed through the duration of the compression stroke. On the other hand, the exhaust valve stays closed for the first stage of the compression stroke, forcing the engine to expel energy compressing the contents of the combustion chamber. Then, at the second stage of the compression stroke (e.g., toward the top of the compression stroke) the exhaust valve is opened, and as a result, all of the energy the engine expended into compressing the contents of the combustion chamber is vented at atmosphere (e.g., through an exhaust system of a vehicle).

One example of an internal combustion engine capable of implementing the control strategies discussed above will now be described in detail. FIG. 1 illustrates a schematic representation of one example of a compression ignition internal combustion engine 10 having an engine cycle comprising an intake stroke, a compression stroke, an expansion stroke, and an exhaust stroke. As best shown in FIG. 1, the engine 10 includes at least one combustion chamber 12 defined by a cylinder 14 and a piston 16 that is operable to reciprocate within the cylinder 14. Although only one combustion chamber 12 is shown, it should be appreciated that the present disclosure contemplates the engine 10 including any number of cylinders, each defining a combustion chamber. Embodiments of the present disclosure may operate similarly for each combustion chamber or differently for each combustion chamber.

The combustion chamber 12 is shown communicating with an intake manifold 22 and an exhaust manifold 26 via intake valve 30 and exhaust valve 34, respectively. In the example of FIG. 1, the internal combustion engine 10 is shown as a direct injection, diesel engine with injector 36 located to inject fuel directly into cylinder 14. Fuel is delivered to fuel injector 36 by a fuel system (not shown), including, for example, a fuel tank, fuel pump, and a high pressure common rail system. In one embodiment, the fuel injector 36 delivers fuel under control of an engine control module (ECM) 40 communication line 38. Both fuel quantity and injection timing may be adjustable. The ECM 40 is also in communication with at least one engine runaway sensor 42 via a sensor communication line 44. In the illustrated example, the engine runaway sensor 42 may be a conventional speed sensor, known in the art.

In several embodiments, the intake valve 30 and exhaust valve 34 can be cam-actuated, i.e., opened and closed, at regular predetermined timings via one or more cams operably coupled to rocker arms in a conventional manner. Additionally or alternatively, the intake valve 30 and exhaust valve 34 can be cam-actuated with variable valve timing to improve fuel efficiency and/or the like. As will be described in more detail below, the cam(s) may further include a second set of cam lobes configured to actuate the intake valve 30 and/or exhaust valve 34 with variable timing in order to retard engine speed. In yet other embodiments, the present disclosure contemplates a non-cam actuated intake valve 30 and/or exhaust valve 34, such as those that might be electronically controlled and actuated via hydraulic or pneumatic pressure, electro-magnetically, electro-mechanically, etc., at selected timings during a "normal" operational state and/or an "engine retard" or "engine overspeed" operational state.

In order to carry out the control strategies described herein for controlling and/or inhibiting engine overspeed, the internal combustion engine 10 may further include at least one "combustion interrupter" mechanism configured to operate the intake and/or exhaust valves of the engine to at least interrupt at least the combustion cycle, and in turn, control and/or inhibit engine overspeed. In one embodiment, the "combustion interrupter" mechanism includes a set of variable timing cam lobes positioned adjacent a set of conventionally configured and arranged cam lobes on the one or more camshaft(s) 46 (See FIG. 2A). In that regard, the set of conventionally configured and arranged cam lobes are configured to actuate the intake valve 30 and/or exhaust valve 34 during a "normal" operational state. On the other hand, the set of variable timing cam lobes are configured and arranged in order to retard engine speed during an "engine overspeed" state in accordance with one or more of the control strategies described herein.

Figure 2A:
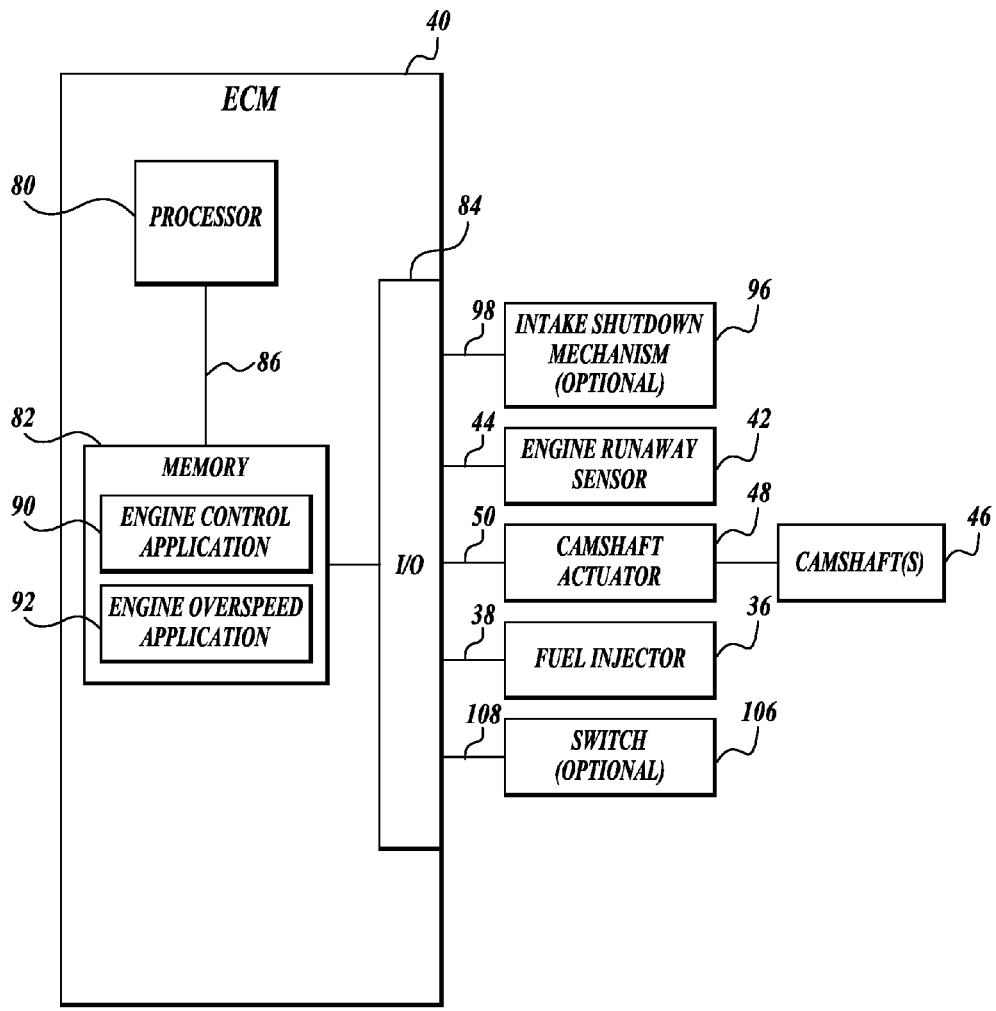
FIGS. 2A-2C are block diagrams of examples of engine control modules (ECM) according to aspects of the present disclosure.

As best shown in FIG. 2A, the ECM 40 is also in communication with at least one controllable camshaft actuator 48 via a communication line 50. The camshaft actuator 48 is configured to shift the one or more camshafts 46 between a first position in which the intake valve 30 and/or exhaust valve 34 is actuated by the conventionally configured set of lobes and a second position in which the intake valve 30 and/or exhaust valve 34 is actuated by the variable timing set of lobes.

While the engine 10 described above may include a camshaft 46 having first and second sets of cam lobes in order to operate the engine in both a "normal" state and an "engine overspeed" state, it will be appreciated that other variable valve timing techniques may be used to achieve the same or similar result. For example, in one embodiment, the camshaft 46 may include only one set of lobes that include first and second cam lobe sections that are configured substantially similar to the first and second sets of cam lobes, respectively, described above.

Figure 2B:
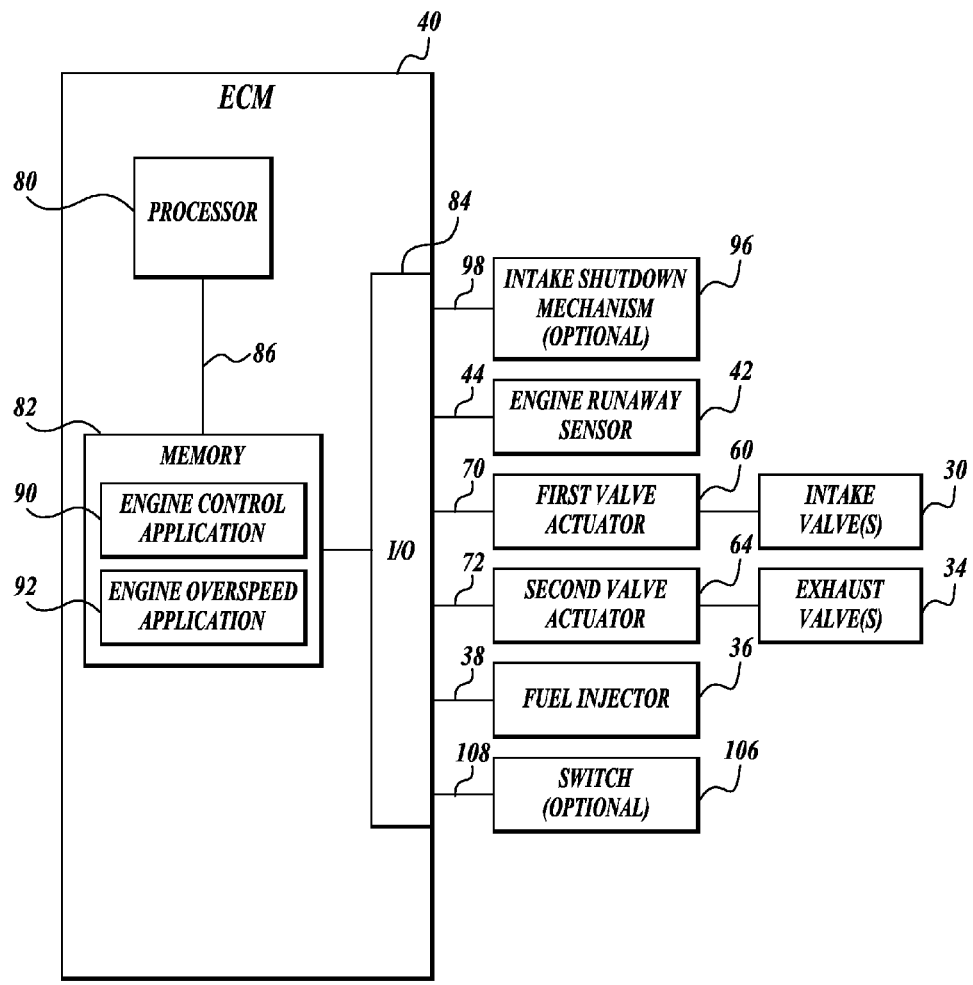

In other embodiments, the "combustion interrupter" mechanism includes first and second valve actuators 60 and 64, coupled to intake valve 30 and exhaust valve 34, respectively, as best shown in FIG. 2B. In some embodiments, first and second valve actuators 60 and 64 are employed in lieu of a conventional camshaft or a variable valve timing camshaft, such as the camshaft 46, and as such, affects variable valve timing in a camless manner in order to carry out the control strategies described herein. In other embodiments, the first and second valve actuators 60 and 64 may operate in conjunction with a camshaft of conventional configuration in order to carry out the control strategies described herein.

In the illustrated embodiment, the first or intake valve actuator 60 and the second or exhaust valve actuator 64 are electrically controlled. In that regard, the valve actuators 60 and 64 may include a linear actuator of the traveling nut type, a solenoid or other electro-magnetic device, etc. The valve actuators 60 and 64 are operatively associated with the intake and/or exhaust valves 30 and 34 in a suitable manner for moving the respective valves between valve open and valve closed positions. Other actuating strategies, such as electro-hydraulic, electro-pneumatic, etc., for opening/closing the valves under control of the ECM 40 could be employed without departing from the scope of this disclosure. In one embodiment, the valve actuators 60 and 64 are of the traveling nut type, each including a piston that is selectively moveable between a first or valve closed position and a second or valve open position. In other embodiments, the valve actuators 60 and 64 include a suitably configured hydraulic and/or pneumatic linear actuator having a piston movable between a first position and a second position. In some embodiments, one of the first and second positions is biased. The valve actuators 60 and 64 are coupled in communication with the ECM 40 via communication lines 70 and 72, respectively, and are controlled in a suitable manner via programmed control strategies of the ECM 40.

Still referring to FIGS. 2A and 2B, there is shown a block diagram of one embodiment of the ECM 40 formed in accordance with aspects of the present disclosure. The ECM 40 may include a processor 80, a memory 82, an I/O interface 84 suitably interconnected via one or more buses 86. The memory 82 may include read only memory (ROM), such as programmable ROM (PROM), an erasable programmable ROM (EPROM), and an electrically erasable PROM (EEPROM), etc., random access memory (RAM), and storage memory, such as a solid state hard drive, flash memory, etc. As used herein, the term processor is not limited to integrated circuits referred to in the art as a computer, but broadly refers to a microcontroller, a microcomputer, a microprocessor, a programmable logic controller, an application specific integrated circuit, and other programmable circuits, among others.

The memory 82 depicted in FIGS. 2A and 2B are examples of computer-readable media suited to store data and optional programs for implementing aspects of the present disclosure. As used herein, the term "computer-readable media" includes volatile and non-volatile and removable and non-removable memory implemented in any method or technology capable of storing information, such as computer-readable instructions, data structures, programs, or other data. In the embodiment illustrated, the memory 82 may include an engine control application 90 that causes the processor 80 to control the engine (fuel delivery, etc.) during normal operational conditions according to algorithms known in the art. The memory 82 may also include an engine overspeed application 92, including one or more engine retard programs or routines that cause the processor 80 to control the operation of the intake and exhaust valves 30 and 34 via the actuators 60 and 64, the switching of the camshaft 46 between the first set of lobes and the second set of lobes (or first section of the lobes and the second section of the lobes, etc.

It will be appreciated that the ECM 40 may receive data from other sensors (not shown) indicative of engine operating parameters, etc., in order to affect appropriate timing and duration of fuel delivery, valve actuation, etc.

Although both the intake valve actuator 60 and the exhaust valve actuator 64 can be used as the "combustion interrupter" mechanism in the illustrated engine 10, it should be appreciated that the "combustion interrupter" mechanism in some embodiments could employ only the exhaust valve actuator 64 for carrying out one or more strategies described herein. Additionally, in engines with multiple combustion chambers, the "combustion interrupter" mechanisms of some of the chambers could use both the intake valve actuator 60 and the exhaust valve actuator 64 while the others could use only the exhaust valve actuator 64. Moreover, the present disclosure contemplates engines in which less than all, and possibly only one, of the exhaust valves and/or intake valves have some variable valve timing capability. Alternatively, the present disclosure contemplates a single valve actuator for controlling the intake and/or exhaust valve for each combustion chamber.

Figure 2C:
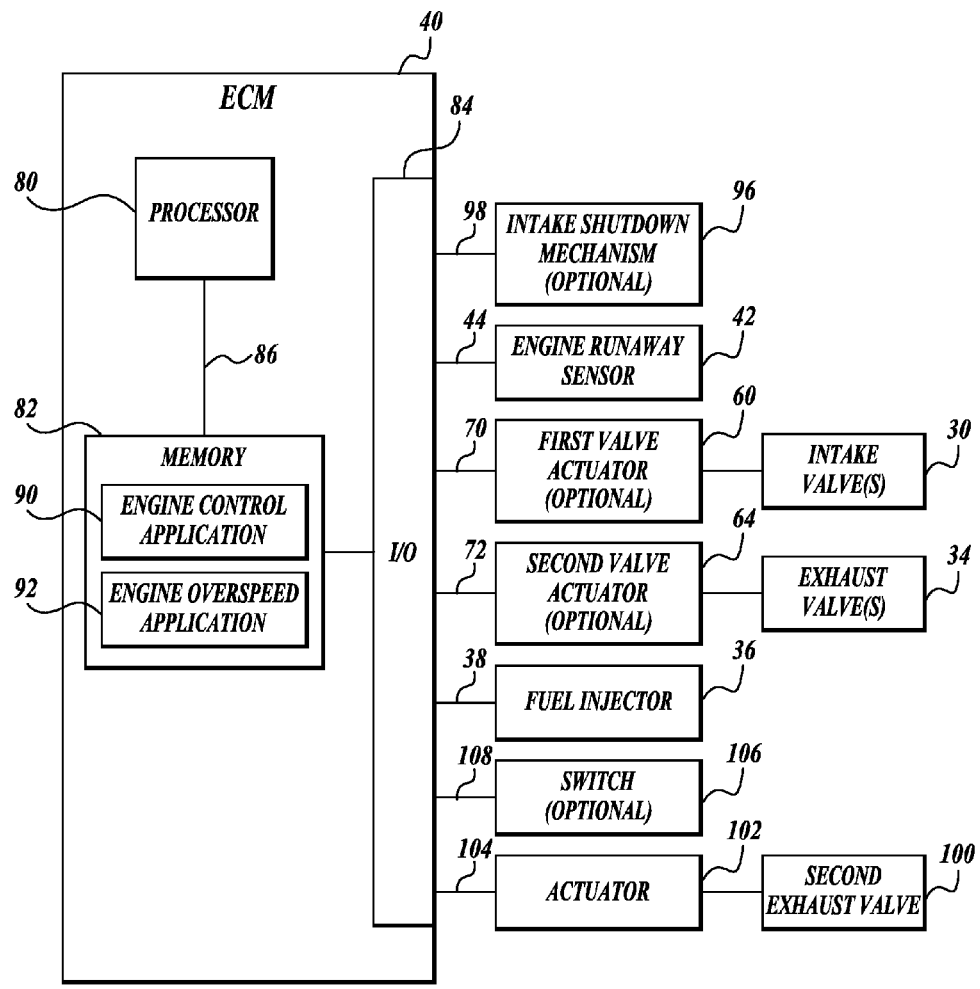

In yet other embodiments, the "combustion interrupter" mechanism of the engine may alternatively or additionally include a controllable second exhaust valve 100, as best shown in FIG. 2C. In these embodiments, the second exhaust valve 100 is non-cam actuated. Instead, it is actuated by a controllable actuator 102 that receives suitable control signals from ECM 40 via communication line 104. The actuator 102 may be configured substantially identical to actuator 64 and/or the like. In these embodiments, for example, the intake and exhaust valves are normally controlled by the rotation of an associated camshaft in a conventional manner during the intake stroke, a compression stroke, an expansion stroke, and an exhaust stroke. As described in one or more of the control strategies above, the second exhaust valve 100 then can be actuated by actuator 102 to an open position during the intake stoke, at the beginning of the compression stroke, or somewhere toward the top of the compression stroke, among others, to retard engine overspeed.

The engine 10 may also include an air intake shutdown mechanism 96 positioned within an air supply line or intake manifold 22 connecting the combustion chamber 12 to a source of air. The air intake shutdown mechanism 96 is moveable between a first position in which the air supply line to the combustion chamber 12 is open and a second position in which the air supply line to the combustion chamber 12 is blocked. The air intake shutdown mechanism 96 is in communication with the ECM 40 via an air intake shutdown communication line 98.

Figure 3:
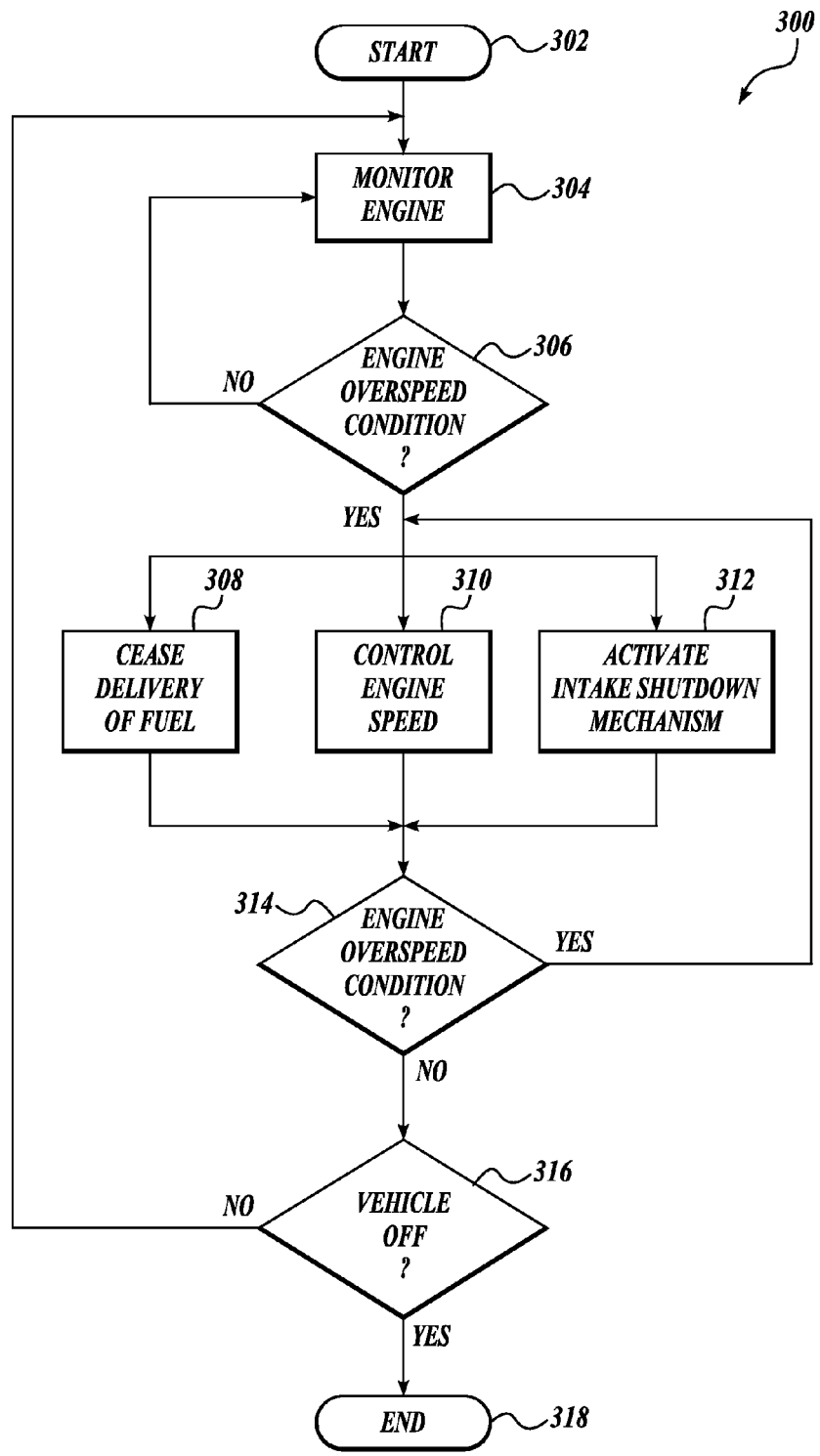
FIG. 3 is a flow diagram of one example of an engine overspeed method.

Referring now to FIG. 3, there is shown a flow chart illustrating an example of an engine overspeed method 300 carried about by the ECM 40, including, for example, the execution of the engine overspeed application 92, and one or more of the engine retard routines. In this regard, the engine overspeed application 92, and one or more of the engine retard routines may be loaded from non-volatile memory, such as EEPROM, into volatile memory, such as RAM, at vehicle startup. Then, a fetch and execute cycle in which instructions are sequentially "fetched" from the RAM and executed by the processor 80 is performed for carrying out aspects of the present disclosure. As such, after vehicle startup, the engine overspeed application 92 monitors the operation of the engine, determines the presence of an engine overspeed condition, and slows down or retards the engine according to one or more of the engine retard routines in order to return the engine to normal operating conditions. In some embodiments, the engine retards to a point where the engine is shutdown.

As will be appreciated by one skilled in the art, the specific routines described herein in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used.

As best shown FIG. 3, the method 300 begins at block 302. The method then proceeds to block 304, where the operation of the engine is monitored. For example, in one embodiment, engine speed is monitored via the processing and/or storage of data received from, for example, engine runaway sensor 42. It will be appreciated that the monitoring of the engine can occur continuously during the method 300.

Next, at decision block 306, a test is performed to determine whether the engine is operating in an engine overspeed condition. Generally described, an engine overspeed condition can be characterized as when the engine 10 is operating at uncontrollable high speed. In some embodiments, the engine runaway sensor 42 will periodically sense and communicate to the ECM 40 data indicative of engine speed (rpms). It should be appreciated that many engines already include engine speed sensors and logic (such as engine control application 90) to monitor and maintain the desired engine speed. If the sensed engine speed is greater than a predetermined threshold "safe" engine speed, or if engine speed is increasing when not commanded to do so, it is determined that the engine 10 is in an engine overspeed condition.

In several embodiments, the predetermined threshold "safe" engine speed can be a speed slightly greater than a maximum allowable speed, sometimes referred to as a maximum rated speed, at which the engine 10 is designed to operate. However, it should be appreciated that the predetermined threshold "safe" engine speed can be any engine speed over which it is undesirable for the engine to operate.

If it is decided at decision block 306 that the engine 10 is operating in an engine overspeed condition, the method proceeds to blocks 38-312, in order to control the overspeed condition of the engine 10. However, if it is determined at decision block 306 that the engine 10 is not operating in an engine overspeed condition, then the method returns to block 304. It will be appreciated that if the engine 10 is not operating in an engine overspeed condition, the engine is running within "normal" operating parameters and controlled according to the engine control application 90.

At block 308, one or more engine retard routines are carried out in order to control and/or obviate the engine overspeed condition. It will be appreciated that the one or more engine retard routines overrides the engine control application 90 in order to address the overspeed condition. When executed, the one or more engine retard routines are configured to cause the ECM 40 to control the "combustion interrupter" mechanism(s) in order to carry out one or more of the control strategies described herein. In some embodiments, the ECM 40 signals the actuators 60 and/or 64 at appropriate times in order to control the movement of the intake and exhaust valves 30 and 34, respectively. In other embodiments, the ECM 40 signals the actuator 48 to shift the camshaft 46 to the second position in which the intake and/or exhaust valves 30 and 34 are actuated by the variable timing set of lobes. In yet other embodiments, the ECM 40 signals an actuator 102 at appropriate times in order to control the movement of the optional second exhaust valve 100.

At block 310, fuel optionally ceases to be delivered to combustion chamber 12. For example, the ECM 40 may send device appropriate signals to the fuel delivery system, including the fuel injector 36, in order to stop delivery of fuel during the engine overspeed condition.

At block 312, the intake shutdown mechanism 96 is optionally activated (e.g., moved to the second, closed position) in order to block the supply of air to the combustion chamber 12 from the intake manifold 22.

From blocks 308-312, the method proceeds to decision block 314, where a determination is made as to whether the engine is operating in a "normal" operation, the engine is shut down, or the engine is otherwise not experiencing an engine overspeed condition.

If it is decided at decision block 314 that the engine 10 is operating in an engine overspeed condition, the method returns to blocks 308-312, in order to control the overspeed condition of the engine 10. However, if it is determined at decision block 316 that the engine 10 is not operating in an engine overspeed condition, then the method 300 proceeds to decision block 316, where a decision is determined as to whether the vehicle is turned off.

If it is decided at decision block 316 that the vehicle is turned off, the method proceeds to block 318 and ends. However, if it is determined at decision block 316 that the vehicle is still turned on, the method 300 returns to block 304 in order to continue monitoring the operation of the engine 10.

Although the ECM 40 may determine whether the engine 10 is in the engine overspeed condition, the present disclosure contemplates other methods of determining if the engine 10 is in the engine overspeed condition, such as observation by an operator. For instance, if the operator observes that the engine 10 is operating uncontrollably, the operator can activate a switch 106 (see FIGS. 2A-C), for example, that signals to the ECM 40 via communication line 108 to activate one or more of the engine retard routines in order to control engine overspeed and/or obviate the engine overspeed condition. These signals may also signal the ECM 40 to cease fuel deliver to the combustion chamber 12, and to optionally activate the intake shutdown mechanism 96 to move from in order to block the supply of air to the combustion chamber 12 from intake manifold 22.

Various principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. An engine overspeed system, comprising:
   a compression ignition engine having at least one combustion chamber defined by a cylinder, a piston operable to reciprocate within the cylinder, and at least one intake valve and at least one exhaust valve associated with the cylinder, the engine having an engine cycle comprising an intake stroke, a compression stroke, an expansion stroke, and an exhaust stroke, wherein the intake valve is closed during the compression stroke;
   an engine overspeed suppression mechanism configured to move the exhaust valve between a valve open position in which gases may enter and/or exit from the combustion chamber and a closed position in which gases are inhibited from entering and/or exiting the combustion chamber; and
   at least one control component being in communication with the engine overspeed suppression mechanism, the at least one control component configured to cause the engine overspeed suppression mechanism to move the exhaust valve to the open position during at least a portion of the compression stroke, wherein the exhaust valve is in the open position for a duration capable of preventing sufficient compression for compression ignition.

2. The engine overspeed system of claim 1, wherein the at least one control component is further configured to cause the engine overspeed suppression mechanism to move the exhaust valve to the open position during the intake stroke.

3. The engine overspeed system of claim 2, wherein the engine overspeed suppression mechanism is further configured to move the intake valve between a valve open position in which gases may enter and/or exit from the combustion chamber and a closed position in which gases are inhibited from entering and/or exiting the combustion chamber, and wherein the at least one control component is further configured to cause the engine overspeed suppression mechanism to move the intake valve to the closed position during the intake stroke.

4. The engine overspeed system of claim 2, wherein the engine overspeed suppression mechanism is further configured to move the intake valve between a valve open position in which gases may enter and/or exit from the combustion chamber and a closed position in which gases are inhibited from entering and/or exiting the combustion chamber, and wherein the at least one control component is further configured to cause the engine overspeed suppression mechanism to move the intake valve to the closed position near below dead center (BDC) of the intake stroke.

5. The engine overspeed system of claim 1, wherein the engine overspeed suppression mechanism is further configured to move the intake valve between a valve open position in which gases may enter and/or exit from the combustion chamber and a closed position in which gases are inhibited from entering and/or exiting the combustion chamber, and wherein the at least one control component is further configured to cause the engine overspeed suppression mechanism to move the intake valve to the closed position during at least a portion of the intake stroke.

6. The engine overspeed system of claim 5, wherein the exhaust valve is closed during at least a portion of the intake stroke.

7. The engine overspeed system of claim 6, wherein at least one of the intake valve and the exhaust valve is opened around bottom dead center of the intake stroke.

8. The engine overspeed system of claim 7, wherein the at least one of the intake valve and the exhaust valve is closed just after bottom dead center of the intake stroke.

9. The engine overspeed system of claim 1, wherein the engine overspeed suppression mechanism includes at least one actuator controllable by the at least one control component and configured to move the exhaust valve between a valve open position and a valve closed position.

10. The engine overspeed system of claim 1, wherein the engine overspeed suppression mechanism includes a set of variable timing lobes and at least one actuator associated with the set of variable timing lobes and coupled in communication with the at least one control component.

11. The engine overspeed system of claim 1, wherein the engine overspeed suppression mechanism includes an actuator controllable by the at least one control component, the actuator being configured to move the exhaust valve between a valve open position in which gases may enter and/or exit from the combustion chamber and a closed position in which gases are inhibited from entering and/or exiting the combustion chamber.

12. An engine overspeed system, comprising:
a compression ignition engine having at least one combustion chamber defined by a cylinder, a piston operable to reciprocate within the cylinder, and at least one intake valve and at least one exhaust valve associated with the cylinder, the engine having an engine cycle comprising an intake stroke, a compression stroke, an expansion stroke, and an exhaust stroke;
an engine overspeed suppression mechanism that includes first and second controllable actuators, said first and second actuators configured to move the intake valve and the exhaust valve, respectively, between a valve open position in which gases may enter and/or exit from the combustion chamber and a closed position in which gases are inhibited from entering and/or exiting from the combustion chamber; and
at least one control component being in communication with the engine overspeed suppression mechanism, the control component configured to cause the first actuator to move the intake valve to the closed position during the intake stroke and the compression stroke and configured to cause the second actuator to move the exhaust valve to the open position during at least one of the intake stroke, the compression stroke, and a second stage of the compression stroke so that compression ignition is suppressed.

13. The engine overspeed system of claim 12, wherein the at least one control component is further configured to cause the second actuator to move the exhaust valve to the open position during the intake stroke and the compression stroke.

14. The engine overspeed system of claim 12, wherein the at least one control component is further configured to cause the second actuator to move the exhaust valve to the open position during the intake stroke and the second stage of the compression stroke.

15. The engine overspeed system of claim 12, wherein at least one of the intake valve and the exhaust valve is opened around bottom dead center of the intake stroke, and wherein the at least one of the intake valve and the exhaust valve is closed just after bottom dead center of the intake stroke.

16. A method of suppressing an engine overspeed condition of a compression ignition engine, the engine having at least one combustion chamber defined by a cylinder, a piston operable to reciprocate within the cylinder, and at least one intake valve and at least one exhaust valve associated with the cylinder, the engine having an engine cycle comprising an intake stroke, a compression stroke, an expansion stroke, and an exhaust stroke, comprising:
determining whether the engine is operating in an engine overspeed condition;
operating an engine overspeed suppression mechanism when the engine is operating in the engine overspeed condition, wherein operating the engine overspeed suppression mechanism comprises:
opening the exhaust valve during the intake stroke; and
opening the exhaust valve during at least a portion of the compression stroke, wherein a portion of the compression stroke has a duration that prevents compression ignition.

17. The method of claim 16, wherein operating the engine overspeed suppression mechanism further comprises
closing the intake valve during the intake stroke and the compression stroke.

18. The method of claim 17, wherein opening the exhaust valve during at least a portion of the compression stroke includes maintaining the exhaust valve in the open position during the compression stroke.

19. The method of claim 17, wherein opening the exhaust valve during at least a portion of the compression stroke includes
closing the exhaust valve during a first stage of the compression stroke, and thereafter
opening the exhaust valve during a second stage of the compression stroke.

20. A method of suppressing an engine overspeed condition of a compression ignition engine, the engine having at least one combustion chamber defined by a cylinder, a piston operable to reciprocate within the cylinder, and at least one intake valve and at least one exhaust valve associated with the cylinder, the engine having an engine cycle comprising an intake stroke, a compression stroke, an expansion stroke, and an exhaust stroke, comprising:
determining whether the engine is operating in an engine overspeed condition;
operating an engine overspeed suppression mechanism when the engine is operating in the engine overspeed condition, wherein operating the engine overspeed suppression mechanism comprises:
closing the intake valve during the compression stroke;
closing the exhaust valve during a first stage of the compression stroke, and thereafter
opening the exhaust valve during a second stage of the compression stroke, wherein the second stage has a duration that suppresses compression ignition.

21. The method of claim 20, wherein operating the engine overspeed suppression mechanism further comprises
closing the intake valve and the exhaust valve during a majority of the intake stroke; thereafter
opening at least one of the intake valve and the exhaust valve around bottom dead center of the intake stroke; thereafter
closing the respective at least one of the intake valve and the exhaust valve just after bottom dead center of the intake stroke.

22. The method of claim 20, wherein operating the engine overspeed suppression mechanism further comprises
opening the exhaust valve during the intake stroke.

23. The method of claim 20, wherein operating the engine overspeed suppression mechanism further comprises
opening the exhaust valve during the intake stroke; and
closing the intake valve during the intake stroke.

24. The engine overspeed system of claim 1, wherein the compression stroke includes a first stage and a second stage, and wherein the exhaust valve is open during the second stage for a duration capable of preventing sufficient compression for compression ignition.

* * * * *